Aug. 19, 1924.
H. C. KNOWLES
ANTIFRICTION BEARING
Filed May 15, 1919
1,505,352
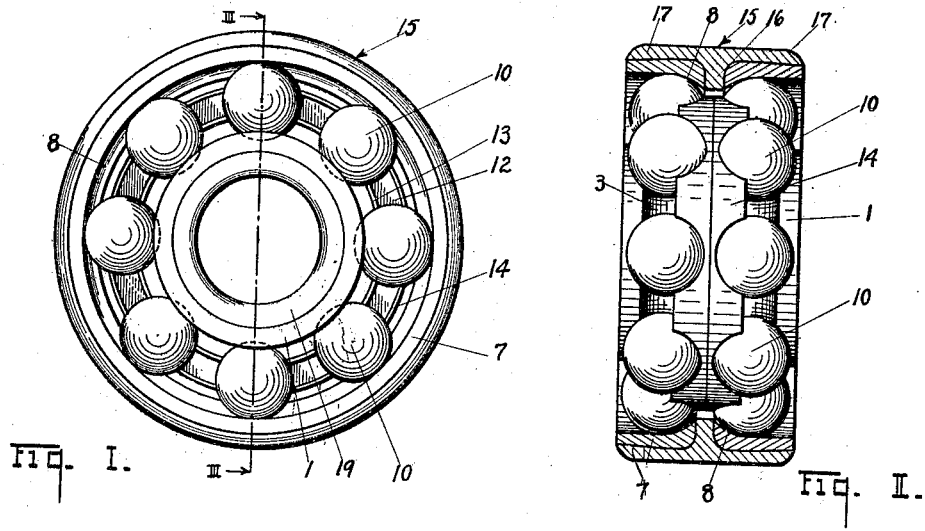
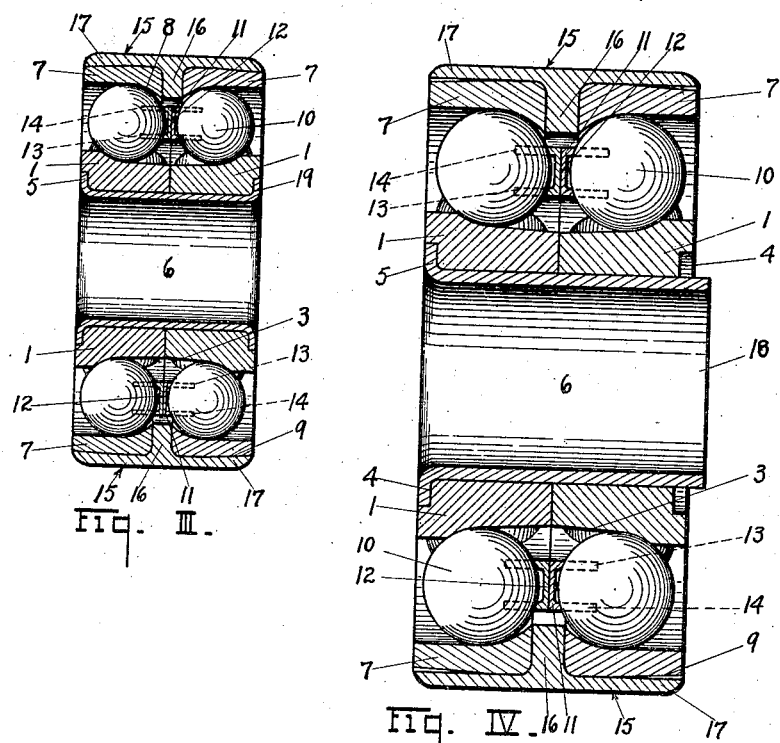
INVENTOR.
Harford C. Knowles
BY Chester H. Braselton
ATTORNEY Patented Aug. 19, 1924.

1,505,352

UNITED STATES PATENT OFFICE.

HARFORD C. KNOWLES, OF ELMIRA, NEW YORK, ASSIGNOR TO THE WILLYS-MORROW COMPANY, OF ELMIRA, NEW YORK, A CORPORATION OF OHIO.

ANTIFRICTION BEARING.

Application filed May 15, 1919. Serial No. 297,415.

*To all whom it may concern:*

Be it known that I, HARFORD C. KNOWLES, residing at Elmira, county of Chemung, and State of New York, have invented certain new and useful Improvements in Antifriction Bearings, of which I declare the following to be a full, clear, and exact description.

This invention relates to anti-friction bearings, and particularly to bearings of this character provided with two rows of anti-friction elements commonly known as double roll bearings. In constructing bearings of this character it is found to be desirable to form the parts in such a manner as to permit the assembling of the various elements together in a manner to obviate the necessity of forming grooves or depressions in the bearing members for the insertion of the anti-friction element after the bearing members are assembled in position relative to each other. Where the various parts of the bearing are thus assembled in position relative to each other it is necessary to provide suitable means for retaining the elements in position so as to prevent disengagement of undesirable movement of the various parts relative to each other when the bearing is in use.

One object of the invention is to provide an improved means for retaining the several bearing elements in position relative to each other.

A further object of the invention is to provide an improved means for suitably retaining the outer bearing members in position relative to the remaining parts of the bearing.

A further object of the invention is to provide an improved form of anti-friction bearings which is of simple construction and efficient in operation.

Further objects of this invention relate to economies of manufacture and details of construction as will hereinafter appear from the detailed description to follow.

The objects of the invention are accomplished in one instatnce by the devices and means described in the following specification, but it is evident that the same may be varied widely without departing from the scope of the invention as pointed out in the appended claims.

A structure constituting one embdoiment of the invention, which may be the preferred, is illustrated in the accompanying drawing forming a part hereof in which:

Figure I is an end elevational view of the completed bearing.

Figure II is a longitudinal view, partially in section, illustrating the relative position of the anti-friction elements with respect to the outer bearing members and the casing member.

Figure III is a longitudinal sectional view, taken along the line III—III of Figure I.

Figure IV is an enlarged longitudinal sectional view, similar to that shown in Figure III, except that the parts are shown in their assembled position prior to the firmly securing of the parts together.

Referring to the drawing, similar reference characters designate corresponding parts throughout the several views, and the sectional view is taken looking in the direction of the small arrows at the ends of the section line.

In the embodiment of the invention illustrated herewith, 1 designates inner bearing members of similar construction, each of which is provided with a curved inclined surface 3 so arranged as to be inclined towards the central portion of the bearing when the members 1 are in assembled position. Each of the inner bearing members 1 is provided with a circular groove 4 formed upon one end thereof, and adapted to receive an out-turned flange 5 formed upon the end portion of the inner tubular sleeve or member 6 when the inner bearing members are properly assembled upon the tubular member.

A pair of outer bearing members 7 are employed, each of which is provided upon its inner surface with a curved portion 8 and has a conical or inclined outer surface as indicated at 9. One of the outer bearing members 7 is adapted to be oppositely positioned with respect to each of the inner bearing members 1 when the various parts are in assembled position, and interposed between each set of opposed bearing members are a plurality of anti-friction elements 10 of the usual construction. Positioned between the two rows of balls or anti-friction elements are a pair of similarly constructed retainer rings or cages 11 each of which is provided with a flat base portion 12 and has extending outwardly upon the side edges thereof a plurality of inner prongs 13 and outer prongs 14. The inner and outer prongs 13 and 14 are positioned in such a manner as to extend between the adjacent balls or anti-friction elements forming each race, and thus maintains the various anti-friction elements properly spaced from each other and in suitable position relative to the remaining parts of the bearing. The base portion 12 of the retainer rings are so positioned as to bear against each other and mutually support and sustain each other while permitting the balls or anti-friction elements in one of the ball races to travel at a different rate of speed than those contained in the other ball race. A casing member 15 is provided with an inwardly extending annular rib 16 formed substantially centrally thereof, and adapted when the parts are in assembled position to extend between and form a supporting wall for engagement with the adjacent ends of the outer bearing members 7. The casing member 15 comprises oppositely extending portions 17 of cylindrical form which extends outwardly from each side of the annular rib 16 and are adapted to overlie the outer inclined or conical surfaces of the outer bearing members. When the various elements making up the bearing are in assembled position the outwardly extending portions 17 of the casing 15 are spun inwardly so as to be forced against and bear throughout a portion of their extent upon the inclined or conical surfaces of the outer bearing members to securely retain these parts in position. After the outwardly extending portions 17 of the casing member has been forced into contact with the outer conical or inclined portions of the outer bearing members, the outer surface of the casing member is ground slightly so as to reduce the central portion thereof a sufficient amount to compensate for the slight inward bending of the outwardly extending portions thereof, and thus give the outer casing member an exterior surface of true cylindrical form.

The method of assembling the various parts of the bearing above described will now be set forth in detail. The inner tubular sleeve 6 is provided at one end thereof with an out-turned flanged portion 5, formed in such a manner so as to be adapted to fit snugly within the groove 4 formed upon the outer edge of one of the inner bearing members 1. One of the inner bearing members 1 is first placed upon the inner tubular sleeve 6 in such a manner that the annular groove formed therein provides a seat for the outwardly extending flange formed upon the end of the tubular sleeve, whereupon the several anti-friction elements or balls which are adapted to co-operate with the inner bearing member 1 are placed in position relative to the outer surface thereof and the corresponding outer bearing member 7 is slipped thereover. In this position of the parts, the outer bearing member 7 and the inner bearing member 1 serve to retain the anti-friction elements included therebetween in position, and prevent their becoming disengaged from the bearing members. One end of the casing member 15 is then placed over the outer bearing member 7 in such a manner that the inwardly extending rib 16 bears against the inner edge of the outer bearing member, and the ball retainer or cage co-operating with the row of anti-friction elements already in position is applied thereto in such a manner as to permit the outwardly extending prongs 13 and 14 to extend between the adjacent balls positioned between the inner and outer bearing members. The second ball retainer is then placed in position in such a manner that its base portion 12 rests upon the base portion of the retainer first inserted, whereupon the second outer bearing member 7 is slipped within the opposite side of the casing member from that occupied by the first outer bearing member, and the balls or anti-friction elements comprising the second race are placed in position in such a manner as to rest upon the second retainer and bear against the curved inclined inner surface of the outer member. The second inner bearing member 1 is then slipped over the free end of the inner tubular sleeve 6 and pressed into close engagement with the first inner bearing member 1 whereupon the opposed curved bearing surfaces of the inner and outer members bear against the balls in such a manner as to hold the various parts in proper position relative to each other as shown in Figure IV of the drawings.

When the various parts of the bearings are thus assembled in position the end portion 18 of the inner tubular sleeve 6 is forced or spun outwardly so as to form an outwardly extending flange 19 similar to the flange 5, which fits closely within the groove 4 formed upon the second inner bearing member 1. The outwardly extending portions 7 of the casing members are then spun inwardly in any suitable manner so as to engage the outer conical or inclined surfaces of the outer bearing member 7 and thus securely retain those members in position, and prevent any possibility of movement of the outer bearing members relative to the remaining portions of the bearing. The various parts of the bearings being thus securely retained in position relative to each other, the outer central portion of the casing member is preferably ground slightly to compensate for the inward bending of the end portions thereof, and give the same a true cylindrical outer surface. It will be apparent that the degree of inclination of the outer surfaces of the outer bearing members is very slight, and therefore the outwardly extending end portions 17 of the casing members will be bent very slightly when forced into engagement with the outer surfaces of the outer bearing members, consequently the outer central portion of the casing requires only a very slight amount of grinding in order to give the same a truly cylindrical outer surface.

It will be apparent from the above description that when the parts are thus in assembled position the curved inclined outer surfaces of the inner bearing members and the curved inclined inner surfaces of the outer bearing members serve to retain the two rows of anti-friction elements together with the retainers co-operating therewith in proper position relative to each other, and positively prevents these rollers from becoming disengaged from the other parts of the bearing. It will be observed also that the curved inclined surfaces formed upon the inner and outer bearing members are arranged in such a manner as to tend to urge the outer bearing members inwardly toward the central portion of the casing, and thus allow the outer bearing members to be retained in position against outward movement relative to the bearing by means of the very slight incline formed upon the outer surfaces thereof when engaged by the inwardly bent end portions of the casing.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. The method of assembling a bearing of the class described comprising the positioning of the several elements including a casing member around the outer surface of an interior sleeve, the forcing outwardly of one end of the sleeve member, and the forcing inwardly of portions of the casing member into engagement with the outer surfaces of certain of the elements.

2. The method of assembling a bearing of the class described comprising the positioning of the several elements including a casing member around the outer surface of an interior sleeve, and the forcing inwardly of portions of the casing member into engagement with the outer surfaces of certain of the elements.

3. The method of assembling a bearing of the class described comprising the arranging of the several elements including inner and outer bearing members, and a casing member around the outer surface of an interior sleeve, the forcing outwardly of one end portion of the sleeve into engagement with one of the inner bearing members, and the forcing inwardly of portions of the casing member into engagement with the outer surfaces of the outer bearing members.

4. In an anti-friction bearing, a pair of annular bearing members whose outer faces are conical with bases together, and an annular casing having an inwardly extending rib engaging adjacent end faces of said bearing members and having oppositely tapered interior faces for firmly engaging the conical faces of said bearing members.

5. In an anti-friction bearing, a pair of bearing rings each having its outer surface conical, and an annular casing therefor having an inwardly projecting rib engaging adjacent end faces of said rings, a cylidrical outer surface and a pair of inner tapered faces to firmly engage the conical outer faces of said rings.

6. The method of assembling a bearing of the character described which comprises positioning the two conical bearing members in opposite sides of the casing, radially compressing the casing to fit the conical surfaces of the bearing members, and finishing off the exterior of the casing to give it cylindrical surface.

In testimony whereof, I affix my signature.

HARFORD C. KNOWLES.